Dec. 23, 1969     C. L. PETERSON ET AL     3,485,376
DISC FILTER SECTOR ASSEMBLY AND SEPARABLE COMPONENTS THEREOF
Filed June 19, 1967     4 Sheets-Sheet 1

INVENTOR.
C. LYNN PETERSON
BY JOHN G. PETERSON
ATTORNEYS

Dec. 23, 1969  C. L. PETERSON ET AL  3,485,376
DISC FILTER SECTOR ASSEMBLY AND SEPARABLE COMPONENTS THEREOF
Filed June 19, 1967  4 Sheets-Sheet 2

INVENTOR.
C. LYNN PETERSON
BY JOHN G. PETERSON
Grewey Edwards
ATTORNEYS

Dec. 23, 1969     C. L. PETERSON ET AL     3,485,376
DISC FILTER SECTOR ASSEMBLY AND SEPARABLE COMPONENTS THEREOF
Filed June 19, 1967     4 Sheets-Sheet 3

INVENTOR.
C. LYNN PETERSON
BY JOHN G. PETERSON
ATTORNEYS

United States Patent Office

3,485,376
Patented Dec. 23, 1969

---

3,485,376
DISC FILTER SECTOR ASSEMBLY AND SEPARABLE COMPONENTS THEREOF
C. Lynn Peterson and John G. Peterson, Salt Lake City, Utah, assignors to Peterson Filters & Engineering Company, Salt Lake City, Utah, a corporation of Utah
Filed June 19, 1967, Ser. No. 651,344
Int. Cl. B01d 33/22
U.S. Cl. 210—331
28 Claims

ABSTRACT OF THE DISCLOSURE

Sector for disc filters including internal support and drainage structure enclosed by preformed, pre-shaped cover of metallic filter media of corresponding size and shape with complete support structure wedged into cover forming integral assembly. Support structure may be wood or plastic and single member or formed of plural sections which may be interchangeable identical sections disposed side by side in assembly. Flow-conducting passages may be formed in both flat surfaces of such sections or by spacing adjoining sections or may be internal in plastic units. Open ends of cover permit insertion and removal of support structure for assembly and repair. A clamping arrangement for detachably securing outer open end of cover to internal support structure. External attachment structure supports assembled cover and internal support without transmitting radial forces and for alinement of adjoining sectors.

---

This invention relates to a sector assembly for disc filters and to drainage members and cover members of such sectors.

The discs comprising the filter surfaces of a disc filter are composed of a plurality of sectors shaped and arranged to form a disc for rotation on a central shaft. The filter media forming the sides or flat faces of the disc may be any suitable material. Various types of fabric have been utilized for this purpose, the interstices of which are quite fine and provide the openings through which filtrate is drawn from the body of fluid or slurry in which portions of the disc are submerged and filtrate is removed through the disc structure and supporting central shaft while solids of the slurry under treatment form on the fabric surface as a cake and are removed at a selected position in the cycle of rotation of the disc by scraping, usually accompanied by a reverse pressure or blow effect applied from interiorly of the sector.

The filtering action and cake discharge result from differential pressures established on the face of the disc inducing liquid flow from outside to inside through a portion of the cycle of rotation and blow or creation of uniform pressures through another portion of the cycle, facilitating removal of the formed cake from the exterior surface of the disc. Subjecting the fabrics to the differential pressure conditions creates bulging and sagging effects and the frictional effect of the scraper contact during cake removal produces considerable wear on the fabric surfaces, requiring frequent repair and replacement.

Metallic compositions have been available as the filter media, particularly wire cloth and perforated sheet material having openings or interstices of suitable fineness to effect the desired liquid-solids separation. Such materials usually are much more resistant to wear and corrosion than the fabrics, avoid blinding, and less repair and replacement is required when such materials are used. However, the problem of attaching such filter media as the exterior surface of the filter disc has presented considerable difficulty due to the need for having the exterior covering media conform in size and shape to the interior drainage structure. If the fastening is accomplished by bolting, stapling or the like in which a relatively large number of such fastenings are provided over a given surface area, the problem of removal for repair and replacement becomes quite difficult.

Peterson et al. Patent No. 2,885,083 owned by the assignee of the present invention discloses a form of filter media assembly designed for simplifying the assembly and disassembly of sector components. The filter media as shown and described in said patent is preshaped as a tubular body so as to conform to the size and shaping of the drainage structure when the latter is fitted into its interior, and final shaping is obtained by the manner of fastening the filter media cover to the interior drainage structure as described in the patent.

Accordingly, it is an object of this invention to provide a sector assembly for disc filters including an interior support and drainage structure and an exterior filter medium surface which is easily and quickly assembled or disassembled and requires no final shaping changes of external surfaces during the assembly procedures.

Another object of the invention is to provide a preformed and pre-shaped cover of metallic filter media which is easily and quickly applied to the interior drainage structure and which is durable and economical in use.

A further object of the invention is to provide a novel type of drainage assembly for the sectors of disc filters which may be formed of wood or plastic and which are easily installed in or removed from the metallic filter medium cover.

Still another object of the invention is to provide a novel arrangement for support and alinement of an assembled filter media cover and support structure.

It is still another object of this invention to provide a novel drainage arrangement between adjoining sections of internal support structure of a disc filter sector assembly.

Other objects reside in novel details of construction and novel combinations and arrangements of parts, all of which will be set forth in the course of the following description.

The practice of the present invention involves a number of innovations in the disc filter art. Many users of such equipment prefer a drainage structure of wood and the constant wetting of such a heavy wooden structure as formerly designed without effective removal of surface moisture when operation is stopped frequently results in rotting of moist surfaces long before normal wear would require replacement of the drainage structure. By utilizing a novel type of sectional arrangement in forming the drainage structure with individual sections of identical size and shape of lesser dimension at the outer ends and arranged for interchangeable arrangement in the sector assembly, replacement of only a portion of the assembled structure will effectively remove any rotted portion while permitting continued use of the remaining portions of the sector assembly.

Another innovation is that the same size and shape of the sectional components can be produced in a plastic composition, giving the user all the advantages of the drainage pattern of a wooden drainage structure and eliminating deterioration from rot.

Another innovation is the provision of a preformed and pre-shaped cover of metallic filter media having open ends to facilitate insertion and removal of drainage structure components for assembly or replacement and which has the surface portions bordering the open ends specially shaped to permit a positive and simple fastening application which effectively retains the exterior configuration of the filter media after installation in a sector assembly.

Other innovations reside in the novel shaping and arrangement of external and internal flow conducting passages of support and drainage structure components which provide an accelerated flow velocity between collection point and point of discharge, as well as adequate flow capacity to satisfy the operational requirements of the sector.

The practice of this invention will be described with reference to the accompanying drawings illustrating typical embodiments of the features of the invention. In the drawings, in the several views of which like parts bear similar reference numerals.

Figure 1:
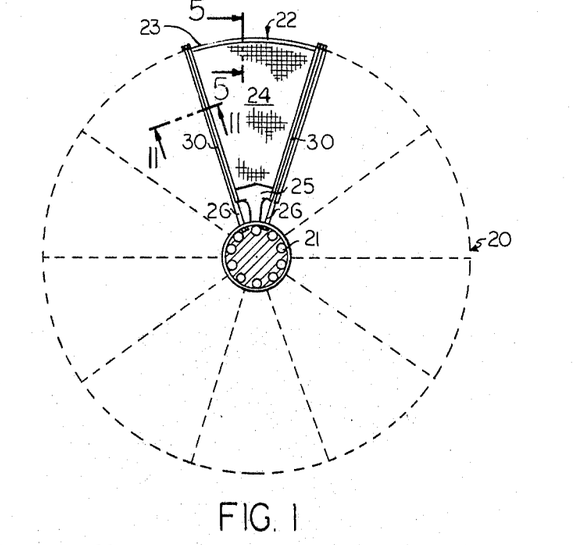
FIG. 1 is a partial side elevation view showing schematically an arrangement of one sector and its positioning on a rotary shaft with adjoining similar sectors shown in broken lines to form a disc filter.

As shown in FIG. 1, a disc filter 20 represented by the dash lines has a central shaft 21 which may be of any well known type providing connection of valve controlled lines to individual sectors 22 of the assembly, one of which has been represented by the full line representation in FIG. 1. It will be understood that the other segments of the representation of disc filter assembly shown in FIG. 1 will be corresponding sectors. As shown, the sector 22 has an outer end piece 23 securing filter media 24 at its outer ends on enclosed support and drainage structure (not shown) which is detachably secured at its inner end to a bell member 25. Hollow side pieces 30 detachably interconnect the outer end piece 23 with the bell member 25 and adjoining sectors 22 are aligned through rods 26 extending through side pieces 30 interconnected at their inner ends with shaft 21. This arrangement permits removal and assembly of individual sectors in the initial installation and in later inspection, servicing and replacement operations. The practices of the present invention may be applied to various forms of commercial disc filters already in operation, as well as being incorporated in new disc filter units and FIG. 1 is intended as representative of all such disc filter assemblies.

The practice of the present invention provides a simplified and quick assembly and disassembly of sector components as well as an improved type of filter media cover for the sector and an improved type of drainage structure assembly disposed within the cover when the sector assembly is mounted as shown in FIG. 1. In addition, the mounting arrangement depicted in FIG. 1 and shown in more detail in other views of the drawings to which reference will be made later permits a wide selection of sector components according to the requirements of a given operation and interchangeability features which are highly advantageous. In particular, the practice of this invention provides a close interfitting and wedging relation of filter media cover with interior drainage structure of either a unitary or sectional character having improved drainage control and other advantages which will be set forth in the subsequent description.

Figures 2, 3, 4:
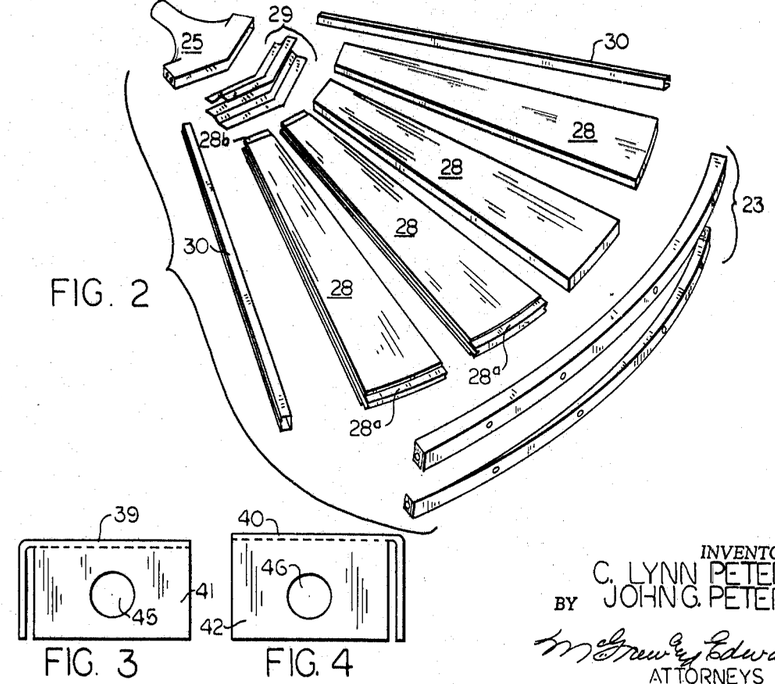
FIG. 2 is a perspective view of the sector shown in FIG. 1 with the component parts shown in an exploded arrangement and having the cover media removed with four internal drainage components of identical shaping shown and the two lefthand drainage structure components illustrating actual shaping of the inner and outer ends and the two righthand drainage structure components illustrated generally.
FIG. 3 is an end elevation view drawn to an enlarged scale of the underpiece portion of the outer end piece illustrated in FIG. 2.
FIG. 4 is an end elevation of the overpiece portion of the outer end piece illustrated in FIG. 2.

FIG. 2 illustrates one form of drainage structure utilized in the present invention and associated components for fastening the drainage structure and its filter media cover (not shown) as a sector assembly on the shaft of a disc filter. FIG. 2 is shown as an exploded view to better illustrate the structural features of the assembly and the two drainage structure sections shown to the left as viewed show the shaping details of such sections while the two sections in the righthand position as viewed omit such details because of the distortion which would result from the perspective showing. As shown, the drainage structure comprises an outer end member 23, a plurality of intermediate sections 28, here shown as four, an inner end joining member 29 adapted to receive the inner ends of members 28 and to fit within a bell member 25 of the type shown in FIG. 1. Hollow side pieces 30 are arranged to abut the exposed sides of the outermost members 28 of the drainage structure assembly after the filter media has been installed and are held at the periphery by a fastening such as the member 23, preferably formed in two parts as shown. The inner ends of side pieces 30 extend along the sides of the bell member 25 in which an end of joining member 29 is fitted to produce an assembly corresponding to the sector 22 of FIG. 1.

Figure 5:
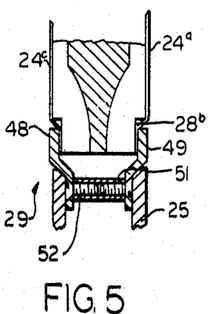
FIG. 5 is a partial cross sectional view drawn to an enlarged scale of the assembled sector taken along lines 5—5 of FIG. 1.

The outer ends 28a of the members 28 are narrowed to permit an open end of the filter media cover member of the present invention to be placed before the outer end member 23 is fitted over the narrowed portions 28a and associated cover portions. Similarly, the opposite end of the cover member 24 as shown in FIG. 1 and in enlarged detail in FIG. 5 is fitted into a recess portion 28b of joining member 29 and is held thereto by a clamping engagement.

Figure 6:
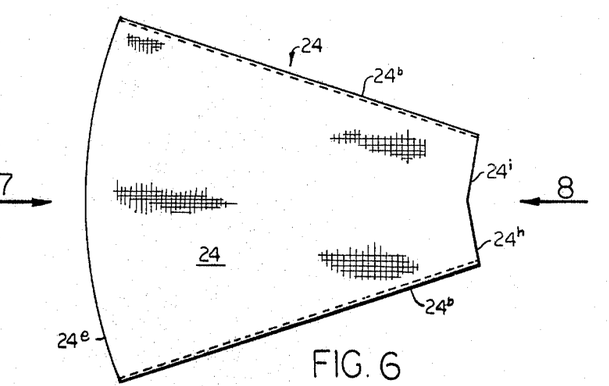
FIG. 6 is a plan view of the pre-shaped cover of metallic filter media.

While any suitable type of filter media cover may be used with a drainage structure of the type depicted in FIG. 2, a feature of the present invention is the provision of a special type of filter media cover which is preformed and pre-shaped to permit it to be secured in close fitting or a taut relation to the drainage structure assembly without additional shaping in its application. Such a cover has been represented at 24 in FIGS. 1 and 6 and may be composed of any suitable metallic filter media, preferably wire cloth or perforated sheet metal providing interstices of suitable fineness to effect an efficient liquid-solids separation. The cover member 24 preferably is formed from two strips or flat lengths of filter media shaped to provide flat facing portions and narrow side portions. Each section has shaped end portions which are angularly disposed in sections transversely of the facing portions 24a. Two such sections have their sides 24b joined preferably on a supporting structural member to form a hollow integral body open at both ends and with facing portions 24a and 24c maintained in substantially parallel relation by the joining of sides 24b in a structural assembly. The body 24 is essentially of keystone shape corresponding to the shape of the drainage structure which it covers in the sector assembly and is of a size corresponding to and only slightly larger than said drainage structure. The outer or peripheral end of body 24 is generally arcuate as shown at 24e and the inner end has two angular portions 24h and 24i of equal length and in intersecting relation along the center line of body 24.

Figure 7:
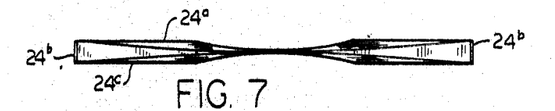
FIG. 7 is an end view of the filter media shown in FIG. 6 as viewed from the wide end.
Figure 8:
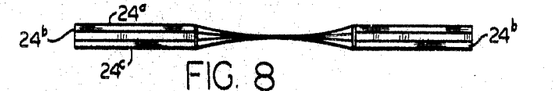
FIG. 8 is an end elevation view of the filter media as shown in FIG. 6 as viewed from the narrow end.

As will be best understood by reference to FIGS. 7 and 8, the central portion of faces 24a and 24c before being placed in covering relation to the drainage structure tends to sag so that the faces in the central portion abut or are in closely spaced proximity. Preferably, the wire material used in forming the cover member is obtained in rolls and the length of cut taken from the roll is only enough to produce a single cover. This cut takes a curved set and in forming each side of the cover member the edge portions are crimped and the curved intermediate portion sags inwardly toward the drainage structure. When the cover member is mounted around the drainage structure, as will be described subsequently, the insertion of the drainage structure or its components, if sectional, fills the space between the faces 24a and 24c so that they are maintained in substantially parallel relationship in a flat overlying relation while functioning as the filter media of the disc filter assembly. The structural support of the sides 24b of body 24 maintains the faces 24a and 24c in substantially uniformly spaced arrangement except at the central portion as depicted in FIGS. 7 and 8 and the cover member because of its preshaping provides a close fit with the drainage structure which maintains the faces 24a and 24c in close contact with the corresponding faces of the drainage structure and in substantially parallel relation while functioning as the filter media.

Figure 9:
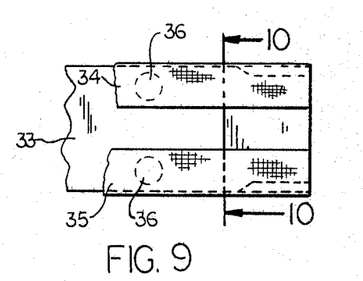
FIG. 9 is an enlarged fragmentary side elevation view illustrating how the ends of the upper and lower pieces of the filter media are secured to the side pieces.
Figure 10:
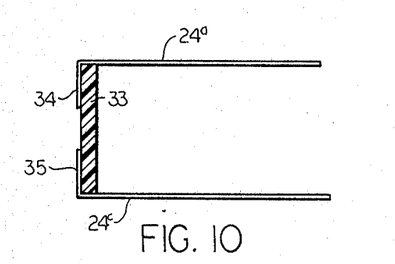
FIG. 10 is a sectional view taken along lines 10—10 of FIG. 9 illustrating one form of plastic strip material for the side pieces.
Figure 11:
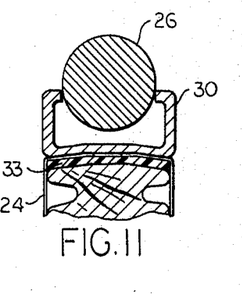
FIG. 11 is a sectional view taken along lines 11—11 of FIG. 1 showing the locking relationship of the hollow side pieces and rod support of the sector.

The structural support for the sides of the filter media may be of various shapes of elongated strips and of various materials, and a preferred form is illustrated in FIGS. 9 and 10 wherein the side piece 24b is shown as comprising a thin strip of material 33 preferably of plastic. End portions 34 and 35 of the filter media of facing portions 24a and 24c, respectively, are mechanically crimped over the top and outer portion of the side piece and are suitably secured thereto preferably as by a spot heat welding indicated at numeral 36.

Figure 15:
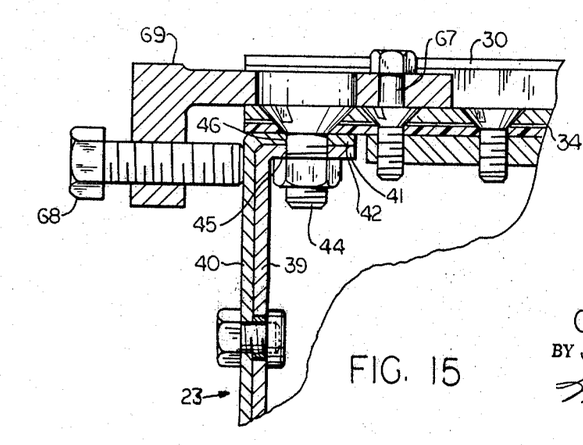
FIG. 15 is a sectional view drawn to an enlarged scale taken along lines 15—15 of FIG. 5 to illustrate the side frame bolting to the end piece at the outer end of the sector with a pusher fixture illustrated thereon.

The outer end member 23, as above described, in a preferred form is of a two-piece clamping type construction inclusive of an underpiece 39 (FIG. 3) and an overpiece 40 (FIG. 4) each of generally L-shaped section having flange portions 41 at each end of the underpiece and flange portions 42 at each end of the overpiece. These pieces are held together as is illustrated in FIG. 5 with the top portion of the overpiece in overlapping relation to the top portion of the underpiece and their respective depending leg or side portions and the flange portions at each end disposed in overlapping relation. The side or leg portions of these pieces are fitted into the recessed portions 28a of the drainage structure 28 and over the outer ends of the filter media thereby holding the filter media on the drainage structure. A spacing or gap is provided between the clamping leg portion and the associated flange portion to permit the ends of the filter media to extend along and under the leg portion of the clamp piece. A preferred arrangement for securing the underpiece 39 to the overpiece 40 in clamping relation is to provide a plurality of spaced plug nuts in the underpiece and a plurality of cap screws extending through the overpiece 40 into the plug nuts as shown. As illustrated in FIG. 15, the flange portions are secured to the hollow frame members 30 at their outer ends as by a side bolt 44 which extends through apertures 45 and 46 in the respective flange portions 39 and 40 so as to interconnect the hollow members 30 with the associated ends of outer member 23 to form the outer connection of an integral external sector attachment assembly in a manner to minimize effects of radial forces on the internal drainage structure 28.

Referring now particularly to FIG. 5, the inner end member 29, in a preferred form, is of a two-piece clamping type construction comprising identical side clamp pieces 48 and 49. Each of these clamping side pieces has an outer end portion which is shaped to fit into the recess 28b of the drainage structure end of the filter media. A spacing sleeve 51 of a preselected length holds the two lower clamping pieces 48 and 49 in spaced relation to provide a flow passage into the bell member and a bolt member 52 secures these pieces in a clamping relation with the inner end of the drainage structure sections 28. The opposing sides of bell member 25 fit over the inner end portions of clamping pieces 48 and 49 (FIG. 5). As is illustrated more particularly in FIG. 12, the inner ends of the hollow member 30 extend to the inner end of the sides of bell member 25 and are detachably secured thereby as by spaced bolts 53 extending inwardly from the sides of the sector to form the inner connection of the external sector attachment structure to support the assembled drainage structure and cover. This side bolting of the hollow pieces at the inner and outer ends serves to contain the cover and internal support and is dimensioned so that radial forces developed when the sector is bolted into position on the central shaft are reduced on the drainage or support member.

Figures 12, 13, 14:
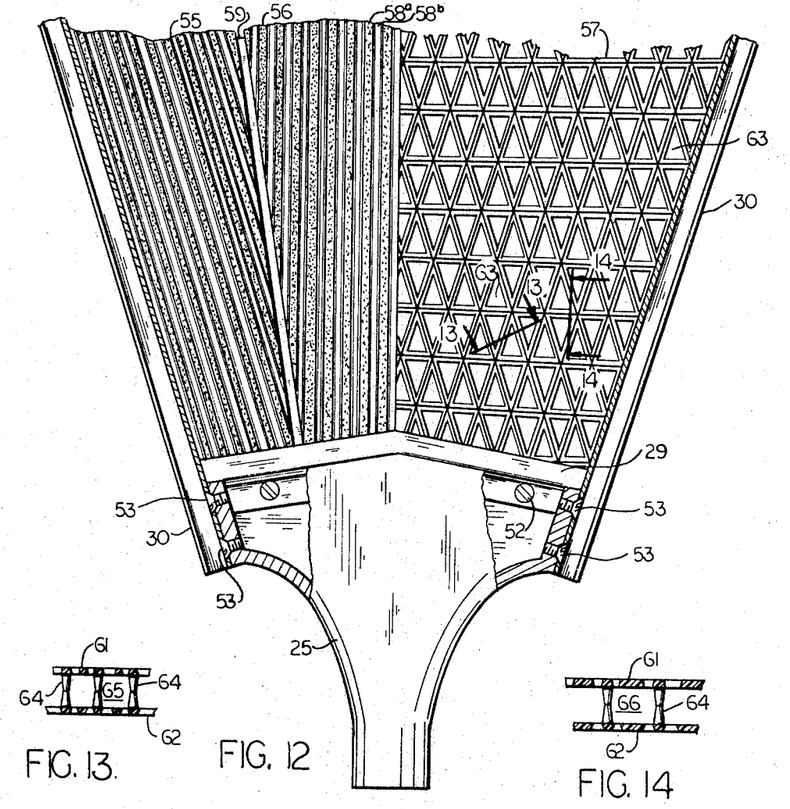
FIG. 12 is a fragmentary side elevation view illustrating the assembled sector on the sector bell partially in section and illustrating the grooved wood and plastic lattice grid forms of drainage structure.
FIG. 13 is a sectional view taken along lines 13—13 of FIG. 12 illustrating the interior drainage arrangement.
FIG. 14 is a sectional view taken along lines 14—14 of FIG. 12, also illustrating the interior drainage arrangement of the lattice grid structure.

Two identical outermost and innermost sections 55 and 56 of the grooved-wood type of drainage structure are shown on the left side of the sector assembly in FIG. 12 and a section 57 of the lattice grid plastic type is shown on the right side to illustrate that alternative forms of drainage structure may be used with the same assembly of sector components as hereinabove described. The grooved-wood type section will preferably be shaped of four identical pieces as illustrated in FIG. 2 with exterior alternately spaced ribs 58a and grooves 58b formed on the outer surfaces and in the form shown the outermost piece extends parallel with the side piece 30 so as to be angularly disposed to direct fluid toward the central groove or passage 59 so as to conduct fluid toward the end bell. These grooved pieces 55 and 56 which are preferably of wood are made of identical shape by preselecting a work point radially outwardly from a center line of the sector assembly and then dividing the sectors into four 9° segments with the inner ends being cut at right angles to the radial lines extending through the work point. In this manner, pieces 55 and 56 as shown in FIG. 12 may be interchanged by turning them over.

Figure 16:
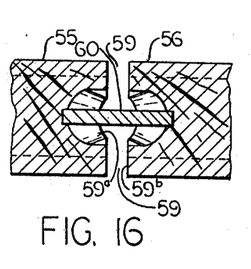
FIG. 16 is a fragmentary inner end elevation view of two of the identical sections having tapering side grooves and a spacer member disposing said sections in spaced side by side relation to form a flow conducting passage therebetween.

A preferred arrangement for joining the sections 55 and 56 is shown in more detail in FIG. 16 wherein adjoining sides thereof are held in spaced relation by a narrow spacing member 60 intermediate of the flat faces of each so as to define a common groove or flow conducting passages 59 in both faces which are of similar section for passing fluid into said passage draining from the grooves 58b other than the flow conducted directly into the inner discharge end of the sector assembly. Each adjoining side of the sections 55 and 56 is provided with an inner recessed groove portion 59a tapering outwardly toward the inner drainage end and an outer flat portion 59b so as to provide a passage 59 having an inner portion of increasing section and an outer portion of uniform section.

The lattice grid section 57, preferably formed of plastic, may be shaped so as to be of a single-piece construction for each 36° segment or a plurality of sections of lesser size forming the 36° segment. The lattice grid section comprises spaced media supporting surface members 61 and 62 having a plurality of generally triangular shaped apertures 63 formed therein which are held in spaced relation to each other by upright members 64 as illustrated more particularly in FIGS. 13 and 14 to provide a plurality of spaced internal passages 65 and 66 disposed lengthwise and transversely thereof so as to pass fluid through its interior from the outer end to the inner end of the sector.

Referring now to FIG. 15, a preferred form of pusher fixture 69 is provided for positioning the cover member over the drainage structure. This fixture is generally L-shaped in section with one leg portion fitting into the hollow portion of member 30. A bolt 67 secures this leg to the side of the sector and a bolt 68 is threaded into the other leg or outer portion so as to press against outer member 23 and thereby press the internal support member in tight-fitting relation with the cover member during assembly.

While the sector assembly of the particular combination of components as above described is preferred, the common drainage groove feature may be employed in other sector assemblies, such as is illustrated in FIGS. 17-20. In this form, the internal drainage structure is in sections, preferably four, and comprises an outermost member 71 and an innermost member 72 which when assembled are of generally keystone shaping and which are held in spaced side-by-side relation by a narrow imperforate member 73 intermediate the flat faces of adjoining members so as to define a common drainage groove and passage 75 in both faces of the sector similar to that shown in FIG. 16. This passage 75 likewise provides for the drainage of fluid from external grooves (not shown). These external grooves may be disposed in arrangements similar to that shown in FIG. 12 but are eliminated from FIG. 16 and subsequent figures to avoid unnecessary detail.

In the arrangement shown in FIGS. 17-20, the inner ends of the filter media (hereinafter designated 24x in the succeeding alternative forms and illustrated specifically as wire) are clamped on or secured directly to the internal support structure directly by the bell member 74 as shown at 76, thus eliminating inner end joining member 29 previously described. An outer, generally arcuate end member 77 preferably of wood is provided which has an internal groove portion 78 which fits over a notched portion 79 at the outer ends of the support sections 71 and 72 (FIG. 18).

Support members 71 and 72 are secured to the outer end member 77 by a threaded member 80 (FIG. 19) secured thereto which extends through an aperture in the outer end member and having a nut 81 threaded thereon which is preferably disposed in a recess portion thereof so as to clamp the outer end member against the ends of support members 71 and 72. Similarly, a threaded member 83 is secured to the inner ends of members 71 and 72 which extends through an aperture in the bell member 74 and is provided with a nut threaded thereon. The filter media 24x in this form may be secured at the sides of member 71 as by staples 85 as shown in FIG. 20 and at the outer ends on the outer end member 77 as by staples 86, if desired (FIG. 18).

Figures 17, 18, 19, 20, 21, 22, 23, 24, 25, 26:
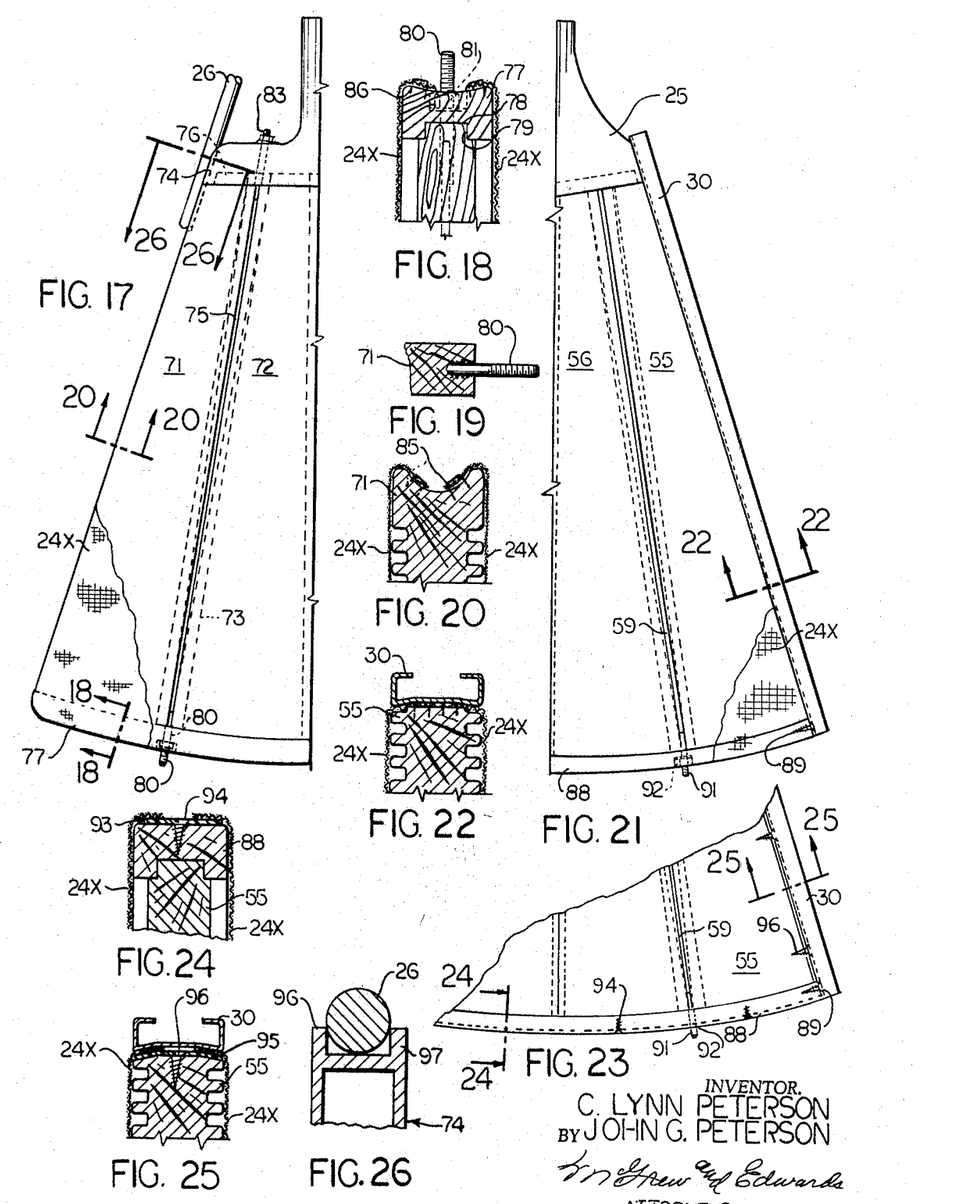
FIG. 17 is an elevation view of an alternative form of sector assembly showing only the left half thereof with the right side being symmetrical therewith utilizing plural drainage support sections held in spaced apart relationship.
FIG. 18 is a sectional view taken along lines 18—18 of FIG. 17 showing an alternative arrangement for attachment of the outer end of the filter media to the outer ends of the drainage sections in the assembly of FIG. 17.
FIG. 19 is an enlarged fragmentary view of the threaded member used to join drainage support sections with the outer end member and bell members.
FIG. 20 is a sectional view taken along lines 20—20 of FIG. 17 showing attachment of the filter media to side portions of the drainage sections.
FIG. 21 is an elevation view of an alternative form of sector assembly showing only the right half thereof with the left half being symmetrical therewith and the hollow pieces and an outer end member detachably joined and the bell member directly securing the filter media to the drainage structure.
FIG. 22 is a sectional view taken along lines 22—22 of FIG. 21 showing an alternative arrangement of the filter media to the section of drainage structure along its sides in the assembly of FIG. 21.
FIG. 23 is a fragmentary elevation view of a sector assembly illustrating another form of securing the filter media to the drainage structure along the outer ends and sides thereof in the assembly of FIG. 21.
FIG. 24 is a sectional view taken along lines 24—24 of FIG. 23 showing the media outer end fastening.
FIG. 25 is a sectional view taken along lines 25—25 of FIG. 23 showing the media side fastening.
FIG. 26 is a sectional view taken along lines 26—26 of FIG. 17.

Referring now to FIGS. 21 and 22, in an alternative form illustrated therein there is yet another modification of the assembly of FIGS. 5 and 12 which comprises identical outermost and innermost sections 55 and 56 comprising half the internal support structure for the sector disposed in side-by-side relation which are directly clamped by the bell member 25, again eliminating member 29 as previously described. In this arrangement, an outer end member 88, preferably of wood and similar to that shown in FIG. 17, extends between the outer ends of the hollow side members 30 and is detachably secured thereto by a fastening member 89 such as a tapered screw which extends through the hollow piece 30. A threaded member 91 similar to that illustrated in FIG. 18 and a nut 92 secure the outer end piece 88 with the outer ends of the filter media 24x held therebetween. In this form, the sides of the filter media 24x may be stapled to the sides of the outermost member 55 with the hollow member 30 disposed thereover as is shown in FIG. 22.

In the arrangement shown in FIGS. 23-25, a strip of material 93, preferably plastic, is secured along the outer side of member 88 and preferably throughout its lengthwise extent with a plurality of spaced fasteners 94, such as screws (FIG. 24). The outer ends of the filter media are then secured to the strip of material 93 as by being heat welded thereto. In a similar manner in this form a strip of material 95 is secured along the outer side of outermost member 55, preferably throughout its lengthwise extent with a plurality of fasteners 96, such as screws. The ends of the filter media are secured to the strip of material 95 as by heat welding.

In the alternative form of sector bell 74 shown in FIG. 17, there is provided as shown in FIG. 26 a pair of spaced upstanding portions 96 and 97 disposed along each side through which the radial rod member 26 extends for locking alinement of each sector or to dispose adjoining sectors in flush relationship in the disc assembly. This arrangement may be used in place of the hollow side pieces 30 extending along the entire side from the bell to the top piece for performing the locking and alinement of adjoining sectors in the disc assembly.

While various materials may be utilized for the component parts of the sector as above described, the hollow side pieces 30 are preferably formed of a metal and when utilized with drainage sections formed of wood have been found to materially reduce the degree of rotting of such wood during extended periods of usage. The size of the hollow side pieces 30 when constructed of a durable metal may be quite small in relation to the entire sector assembly and in the general assembly view of FIG. 1 they are somewhat distorted and larger than actually required for purposes of illustration. A preferred material for the spacing member designated by numerals 60 and 73 is metal and more specifically steel.

The taut relation of the cover over the drainage structure previously referred to is present when the drainage structure is formed of plastic but when it is formed of wood the width of each piece is reduced to provide sufficient clearance to allow for the swelling of the wood and usually does not require a pusher fixture as shown in FIG. 15 to press the drainage structure into the cover member in a taut relationship. Thus, when the wood drainage pieces are used, the hollow side pieces and top pieces will be slightly larger in dimension than the assembled cover and drainage structure and preferably a gasket member of sponge rubber or the like will be secured to the inner side of the hollow pieces 30 to fill any gap between the cover member and the hollow side pieces.

We claim:

1. As a new article of manufacture, a sector component for disc filters comprising a media-supporting body having an outer end portion of greater width and an inner end portion of lesser width, the exterior surface of said body having grooved portions through which a fluid filtrate mixture is caused to flow during filter operation, an inner passage having slotted openings extending throughout the body from an enlarged internal portion to a narrower external portion at an exterior surface of the body, said narrower portions disposed to intercept flow from some of the grooved exterior portions and direct it to the enlarged internal passage, and said inner passage disposed substantially radially when mounted in a disc filter sector and increasing in cross section from its outer to its inner end, so as to accommodate increasing flow velocity approaching the inner end of the body.

2. A sector component as defined in claim 1, having partitioning means dividing the central passage into two undercut flow paths of substantially uniform dimensions throughout substantially the length of the body, each passage portion having slotted openings to an exterior body surface.

3. A sector component as defined in claim 1, in which the exterior grooved passages and at least one internal passage converge toward the narrow end of said body.

4. A sector component as defined in claim 1, in which substantially radial flow-conducting passages and at least one intersecting passage terminate at the narrow end of said body.

5. A sector component as defined in claim 1, in which the body is a plastic composition.

6. A sector component as defined in claim 1, having the internal passage extending along one side of the body in facing relation to a correspondingly shaped passage in the side of an adjoining component in abutting relation thereto in the sector assembly, and means interiorly of the internal passage for holding said sides in abutting relation.

7. A sector component as defined in claim 1, which is adapted to be disposed in interchangeable relation to an adjoining component of corresponding size and shape by reversing its external surface position in the sector.

8. A sector component as defined in claim 1, adapted to be secured in side-abutting relation to another component of corresponding size and shape in the sector assembly with the flat forward and rear surfaces of said components disposed in a common plane.

9. A sector component as defined in claim 1, adapted to be secured in side-abutting relation on its opposite sides to other components of corresponding size and shape in the sector assembly providing internal flow-conducting passages therebetween on both sides of said sections.

10. A sector assembly as defined in claim 9, wherein the plurality of components includes at least one innermost member and one outermost member having angularly extending passages disposed therein in intersecting flow-conducting relation with a common collector passage disposed between said members.

11. A sector component assembly as defined in claim 9, wherein at least one of said passages is of increasing section in the direction of its inner discharge end.

12. A sector assembly as defined in claim 11, wherein the abutting surfaces of the components include a tapering internal recess portion which adjoins another portion of substantially uniform dimension along its lengthwise extent.

13. As a new article of manufacture, a sector component for disc filters comprising a media-supporting body having an outer end portion of greater width and an inner end portion of lesser width, the exterior surface of said body having grooved portions through which a fluid filtrate mixture is caused to flow during filter operation, an inner passage having slotted openings disposed to receive liquid flow from the grooved exterior portions and direct it into said inner passage, said inner passage disposed substantially radially when mounted in a disc filter sector for discharge of collected filtrate into a sector bell, and the inner end portion of said body having narrowed flat surfaces for insertion into flat surfaces of a sector bell assembly so as to be clampingly secured in fluid-tight relation to the sector bell when mounted in a disc filter sector.

14. A sector component as defined in claim 13, wherein the exterior surface of said body and the clamping surface of the sector bell assembly lie in a common plane providing a continuous flat supporting surface for filter media having an end portion secured within the sector bell.

15. A sector component as defined in claim 13, adapted to be assembled in a filter sector with a plurality of other similar components, wherein recessed portions are provided in the inner and outer ends of the components, and securing means, including detachable inner and outer members are fitted in the associated recessed end portions to clamp end surfaces of filter media to the sector components.

16. A sector component as defined in claim 15, adapted to be assembled in a filter sector with a plurality of other similar components, wherein an outer clamping member includes separable overlying and underlying pieces having depending portions held in spaced relation against opposing upper surfaces of filter media in tight fitting relation to the recessed outer ends of the components.

17. In a disc filter, a sector component comprising a media-supporting body having an outer end portion of greater width and an inner end portion of lesser width, the exterior surface of said body having grooved portions through which a fluid filtrate mixture is caused to flow during filter operation, an inner passage having slotted openings disposed to receive flow from the grooved exterior portions and direct it into said inner passage, said inner passage disposed substantially radially when mounted in a disc filter sector, at least one side of said body throughout substantially its entire length having narrowed flat surfaces for insertion into flat surfaces of a clamping assembly so as to be secured against separation when mounted in a disc-filter sector, and means for securing a plurality of similar components as the support structure of a sector, said means including a hollow bell member having an internal passage arranged for fluid-conducting relation with a rotary shaft, elongated hollow members extending radially outwardly from each side of the bell member and detachably secured along associated side surfaces of the bell member, and means for connecting the outer ends of the covered support structure to the hollow members.

18. A sector as set forth in claim 17, wherein a shaft-supported radial rod is the means for connecting the outer ends of the covered structure to the hollow members.

19. In a sector for disc filters of the type having a central rotary shaft, inclusive of means for inducing differential pressures on filter media surfaces of the sector for liquid-solids separation, and filtrate removal means, the improvement which comprises an internal support structure of keystone contour and narrow thickness having fluid-conducting passages for directing drainage flow of air-liquid filtrate mixtures penetrating the filter media directly through the sector bell and into a shaft passage, a hollow cover of pre-shaped metallic filter media for said support structure arranged as an integral, self-sustaining body of corresponding shape and only slightly larger dimension adapted to enclose the support structure when the sector is assembled, and having surfaces maintained in close fitting relation to flat faces and narrow sides of the support structure, said cover having open ends for facilitating separation and assembly of the support structure and said cover media, the latter having a stiff structural member extending along each side of the media in supporting connection therewith for maintaining the flat faces of the media in substantially uniformly spaced relation during separation and assembly, and means for securing the open ends of the media on the support structure and maintaining the assembled support structure and cover on said shaft in fluid-conducting relation therewith.

20. In a sector for disc filters of the type having a central rotary shaft, inclusive of means for inducing differential pressures on filter media surfaces of the sector for liquid-solids separation, and filtrate removal means, the improvement which comprises an internal support structure of keystone contour and narrow thickness having fluid-conducting passages for directing drainage flow of air-liquid filtrate mixtures penetrating the filter media cover directly through the sector bell and into a shaft passage, said support structure including a plurality of interchangeable sections of corresponding size and shape, each having narrowed portions at each end for interfitting with sector fastening components adapted to secure said sections in side-by-side relation with a flat face of one said section in a common plane with the face of the next adjoining section in the sector and each section having its lengthwise axis extending along a radius of the shaft when so secured, and means supported from the shaft for holding the sector-securing components against independent movement during rotation of said sector by said shaft, a hollow cover of pre-shaped metallic filter media for said support structure arranged as a self-sustaining body of corresponding shape and only slightly larger dimension adapted to enclose the support structure when the sector is assembled, and having surfaces maintained in close fitting relation to flat faces and narrow sides of the support structure, said cover having open ends for facilitating separation and assembly of the support structure and said cover media, the latter having a stiff structural member extending along each side of the media in supporting connection therewith for maintaining the flat faces of the media in substantially uniformly spaced relation during separation and assembly, and means for securing the open ends of the media on the support structure and maintaining the assembled support structure and cover on said shaft in fluid-conducting relation therewith.

21. A sector as defined in claim 20, in which the outer ends of the sections are of narrowed thickness, and an outer end member is fitted around the narrowed end portions for maintaining the side-by-side relation of said sections.

22. In a sector for disc filters of the type having a central rotary shaft, inclusive of means for inducing differential pressures on filter media surfaces of the sector for liquid-solids separation, and filtrate removal means, the improvement which comprises an internal support structure of keystone contour and narrow thickness having fluid-conducting passages for directing drainage flow of air-liquid filtrate mixtures penetrating the filter media directly through the sector bell and into a shaft passage, said internal support structure having recessed portions in at least one end formed in the flat faces thereof, a hollow cover of pre-shaped metallic filter media for said support structure arranged as an integral, self-sustaining body of corresponding shape and only slightly larger dimension adapted to enclose the support structure when the sector is assembled, and having surfaces maintained in close fitting relation to flat faces and narrow sides of the support structure, said cover having open ends for facilitating separation and assembly of the support structure and said cover media, the latter having a stiff structural member extending along each side of the media in supporting connection therewith for maintaining the flat faces of the media in substantially uniformly spaced relation during separation and assembly, and means for securing at least one open end of the media on the recessed end portion of the support structure and cover on said shaft in fluid-conducting relation therewith.

23. A sector as set forth in claim 22, wherein an outer clamping member includes separable overlying and underlying pieces having depending portions held in spaced relation against the opposing upper ends of the filter media to clamp the filter media in tight fitting relation to the internal support structure at its outer end.

24. In a sector for disc filters of the type having a central rotary shaft, inclusive of means for inducing differential pressures on filter media surfaces of the sector for liquid-solids separation, and filtrate removal means, the improvement which comprises an internal support structure of keystone contour and narrow thickness having fluid-conducting passages for directing drainage flow of air-liquid filtrate mixtures penetrating the filter media directly through the sector bell and into a shaft passage, said support structure including a plurality of interchangeable sections of corresponding size and shape, each having narrowed portions at at least one end for interfitting with sector fastening components adapted to secure said sections in side-by-side relation with a flat face of one said section in a common plane with the face of the next adjoining section in the sector and each section having its lengthwise axis extending along a radius of the shaft when so secured, and means supported from the shaft for holding the sector-securing components against independent movement during rotation of said sector by said shaft, a hollow cover of pre-shaped metallic filter media for said support structure arranged as a self-sustaining body of corresponding shape and only slightly larger dimension adapted to enclose the support structure when the sector is assembled, and having surfaces maintained in close fitting relation to flat faces and narrow sides of the support structure, said cover having open ends for facilitating separation and assembly of the support structure and said cover media, the latter having a stiff structural member extending along each side of the media in supporting connection therewith for maintaining the flat faces of the media in substantially uniformly spaced relation during separation and assembly, and means for securing the open ends of the media on the support structure and maintaining the assembled support structure and cover on said shaft in fluid-conducting relation therewith.

25. A sector as set forth in claim 24, wherein said external securing structure includes spaced upstanding portions on said bell member adapted for receiving a rotary rod extending radially outwardly from the rotary shaft in a locking friction fitting relation so as to dispose the flat surface portions of adjoining of said sectors in flush relationship on the disc filter.

26. A cover for sector drainage structures of disc filters comprising an integral self-sustaining body of metallic filter media closed circumferentially intermediate its ends and open at its ends, said body being of a size and shape corresponding to a support structure having drainage passages on which structure the body is to be mounted, said body having flat forward and rear surfaces substantially uniformly spaced along opposite sides, and stiff structural members disposed along the sides of the body between the flat surfaces for maintaining said uniformly spaced relation.

27. A cover as defined in claim 26, in which the structural members extend substantially throughout the lengthwise extent of said sides.

28. A cover as defined in claim 26, in which portions of the body bordering the open ends are narrowed for enclosure by associated fastening members when the cover encloses the support structure.

References Cited

UNITED STATES PATENTS

| 1,685,085 | 9/1928 | Hoyt | 210—486 X |
| 2,338,549 | 1/1944 | Shriver et al. | 210—486 |
| 2,696,919 | 12/1954 | Peterson et al. | 210—331 X |
| 2,885,083 | 5/1959 | Peterson et al. | 210—486 X |
| 3,291,312 | 12/1966 | Peterson | 210—486 X |

FOREIGN PATENTS 945,065  12/1963  Great Britain.

REUBEN FRIEDMAN, Primary Examiner

F. A. SPEAR, JR., Assistant Examiner

U.S. Cl. X.R.

210—347, 486, 499